United States Patent Office 3,687,857
Patented Aug. 29, 1972

3,687,857
CORROSION INHIBITED PAINT REMOVER
Myer Rosenfeld, Baltimore, and Troy R. Nichols, Bel Air, Md., assignors to the United States of America as represented by the Secretary of the Army
No Drawing. Filed Dec. 1, 1969, Ser. No. 881,271
The portion of the term of the patent subsequent to Dec. 7, 1987, has been disclaimed
Int. Cl. C09d 9/04; C23f 11/18
U.S. Cl. 252—109
6 Claims

ABSTRACT OF THE DISCLOSURE

A paint remover composition comprising a soluble metasilicate in combination with a metal corrosion inhibitor consisting of sodium and potassium stannate.

---

The invention described herein may be manufactured, used, and licensed by or for the Government for governmental purposes without the payment to us of any royalty thereon.

This invention relates to a composition having utility in the removal of paints from metals. More particularly, it relates to the inclusion of a small amount of sodium or potassium stannate in a metal paint removing composition to inhibit the corrosion of aluminum or alloys thereof.

Sodium and potassium chromates are usually utilized in paint removing formulations to inhibit the corrosion of the metal. However, the disposal of waste chromates constitutes a problem in that soluble chromates are poisonous. Accordingly, many municipalities severely limit the chromium concentration permitted to enter effluent streams or waterways. The allowable hexavalent chromium concentration suggested by the U.S. Public Health Service for the production of fish is 0.50 milligram per liter for industrial waste effluent after mixing with receiving water. Therefore, it is often necessary to dilute the waste containing chromate to a permissible level prior to discharging into effluent streams or waterways. When appreciable concentrations of chromates are needed for proper corrosion inhibition, this becomes a lengthy operation.

It is an object of this invention to provide and disclose an effective composition for the removal of paint from a metal.

It is a further object of this invention to provide and disclose a composition which is non-corrosive to aluminum alloys.

It is a further object of this invention to provide and disclose a composition comprising an effective corrosion inhibitor which is non-toxic to wildlife when discharged into effluent streams or waterways.

Other objects and a fuller understanding of the invention may be had by referring to the following description and claims.

The composition was evaluated for its paint removing ability utilizing test panels measuring 1" by 3" cut from 2S aluminum sheet (aluminum alloy SAE–AA1100) having a thickness of 0.034". Sharp edges were removed with No. 4/0–150 Alundum polishing paper. The aluminum panels were immersed for a period of 5 minutes in an 8 ounce per gallon solution of trisodium phosphate maintained at a temperature of 180° F., water rinsed, immersed in a 50% nitric acid solution for a period of 30 seconds, and again water rinsed. The panels were then immersed for a period of 5 minutes at room temperature in a bath containing one ounce per gallon of water of a composition consisting of 20% ammonium bifluoride and 80% chromium trioxide by weight. The panels were then water rinsed, air dried.

The extent of corrosion was determined by weight changes occurring in test panels. Four panels were used in each determination. Test panels measuring ¾" by 3" and having a thickness of approximately 0.03" were cut from an aluminum material identical to that utilized in the paint stripping evaluations. The panels were lightly polished with No. 150 Alundum paper, washed with acetone, wiped with paper toweling, dipped into absolute ethyl alcohol and again wiped with paper toweling. After weighing to 0.0001 gram, the test panels were immersed in the boiling test solutions for one hour.

To remove any deposit of inhibitor or corrosion film that had formed during the test, the panels were immersed in concentrated nitric acid at room temperature for 120 seconds. The panels were then rinsed under flowing tap water, dipped into absolute ethyl alcohol, dried with paper toweling, weighed to 0.0001 gram and the weight change calculated by difference.

The paint removing compositions were evaluated utilizing the paint systems set forth in Table I below. The paint, which consisted of an olive drab color, was applied by spray to one side of each panel. A coat comprising a dry film of paint having a thickness of 0.7 to 1.0 mil was deposited on the panel.

TABLE I

Systems:
(1) One coat alkyd enamel baked for 30 minutes at 300° F., air dried for 24 hours, then aged for 24 hours at 120° F.
(2) One coat alkyd enamel modified with 20% urea-formaldehyde, baked for 30 minutes at 300° F., air dried for 24 hours, then aged for 24 hours at 120° F.
(3) One coat alkyd-red iron oxide-zinc chromate baked for 30 minutes at 300° F., cooled to room temperature, and followed by one coat alkyd lusterless enamel baked for 30 minutes at 300° F., air dried for 24 hours, then aged for 24 hours at 120° F.
(4) One coat alkyd nitrocellulose lacquer dried for 24 hours, then aged for 24 hours at 120° F.

Illustrative examples of the formulation of the present composition are set forth in Table II below. In said Table II, the sodium metasilicate, sodium and potassium stannate were calculated as anhydrous. The commercial sodium and potassium stannate utilized contained four molecules of water per molecule of the stannate. A straight or branched chained dodecylbenzene sodium sulfonate may be utilized.

TABLE II

| Composition (percent by weight) | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Sodium metasilicate | 100 | 98.77 | 98.77 | 98.38 | 66.67 | 57.14 | 50.0 | 66.67 | 66.11 | 66.11 | 80.00 | 79.21 | 74.35 | 79.21 | 73.53 | 78.96 |
| Dodecylbenzene sodium sulfonate, 86% active | | | | | | | | 33.33 | 33.06 | 33.06 | 20.00 | 19.80 | 18.59 | 19.80 | 18.38 | 19.74 |
| Sodium resinate | | | | | | | | | | | | | | | | |
| Sodium hydroxide | | | | | | | | | | | | | | | | |
| Sodium stannate | | | 1.23 | | | | | .83 | | | .99 | 7.06 | | | | |
| Potassium stannate | | 1.23 | | | | | | | .83 | | | | | .99 | 8.09 | |
| Potassium chromate | | | | 1.62 | 33.33 | 42.86 | 50.0 | | | | | | | | | 1.30 |

| Composition (percent by weight) | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| Sodium metasilicate | 51.14 | 66.67 | 66.12 | 66.12 | 62.69 | 62.11 | 65.94 | 50.00 | 80.09 | 79.21 | 79.21 | 78.94 | 75.11 | 72.11 | | 99.08 |
| Dodecylbenzene sodium sulfonate, 86% active | 14.29 | 33.33 | 33.06 | 33.06 | 31.35 | 31.06 | 32.97 | 25.00 | | | | | | | | |
| Sodium resinate | | | | | | | | | 19.91 | 19.70 | 19.70 | 19.62 | 18.67 | 17.93 | | |
| Sodium hydroxide | | | | | | | | | | | | | | | 95.34 | |
| Sodium stannate | | | .82 | | 5.96 | | | | | 1.09 | | | | | 4.76 | |
| Potassium stannate | | | | .82 | | 6.83 | | | | | 1.09 | | | | | .92 |
| Potassium chromate | 28.57 | | | | | | 1.09 | 25.00 | | | | 1.44 | 6.22 | 9.96 | | |

The panels, which were coated in accordance with the paint systems of Table I, were stripped by immersing each panel vertically for a period of one hour in a boiling aqueous solution of a paint remover consisting of the formulations set forth in Table II, in the concentration shown in Table III, and removing the panels periodically to determine the extent of paint stripping. The panels were then evaluated by removing loosened material with a brush under a stream of running water and rinsing with a stream of hot water. The amount of time required to remove all of the paint was noted. Illustrative examples are set forth in Table III below.

In addition, aqueous solutions of the formulation of Table II, in the concentrations shown in Table III, were evaluated in regards to their corrosion properties. Illustrative examples are set forth in Table II below. In said Table III, the percent corrosion inhibition has been corrected for a blank, i.e., 0.05 mg. average weight loss.

rosion inhibition. This is an enormous concentration and would present a major waste disposal problem.

Example 8 illustrates another paint remover formulation in which dodecylbenzene sodium sulfonate is present. Examples 9 and 10 illustrate complete inhibition attained with a small amount of sodium or potassium stannate. In formulation 12 and 14, it is seen that less than one percent of sodium or potassium stannate results in complete inhibition, although higher percentages may be utilized as shown in formulations 13 and 15. Inefficiency at low concentrations of potassium chromate is shown by formulation 16. Formulation 17 discloses that a composition having a potassium chromate content of more than 28% is required to obtain the desired inhibition. Formulation 23 and 24 have the same proportions of metasilicate and sulfonate as formulation 18. The low percentage of chromate in formulation 23 resulted in poor inhibitor properties. The utilization of a larger amount of chromate in formu-

TABLE III

| Formulation | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Concentration (g./100 ml.) | 2.00 | 2.025 | 2.025 | 2.033 | 3.00 | 3.50 | 4.00 | 3.00 | 3.025 | 3.025 | 2.50 | 2.525 | 2.69 | 2.525 | 2.72 | 2.533 |
| Time for 100% of coating to be removed (min.): System: | | | | | | | | | | | | | | | | |
| 1 | 2¼-2½ | 2¼-2½ | 2¼-2½ | 2¼-2½ | 2¼-2½ | 2¼-2½ | 2¼-2½ | 2¼-2½ | 2¼-2½ | 2-2¼ | 2-2¼ | 2-2¼ | 2-2¼ | 2-2¼ | 2-2¼ | 2-2¼ |
| 2 | 5¾-6 | 5¾-6 | 5¾-6 | 5¾-6 | 5¾-6 | 5¾-6 | 5¾-6 | 5¾-6 | 5¾-6 | 5¾-6 | 5¾-6 | 5¾-6 | 5¾-6 | 5¾-6 | 5¾-6 | 5¾-6 |
| 3 | 7½-8 | 7½-8 | 7½-8 | 7½-8 | 7½-8 | 7½-8 | 7½-8 | 7½-8 | 7½-8 | 7½-8 | 7½-8 | 7½-8 | 7½-8 | 7½-8 | 7½-8 | 7½-8 |
| 4 | 6-6¼ | 6-6¼ | 6-6¼ | 6-6¼ | 6-6¼ | 6-6¼ | 6-6¼ | 2½-3 | 2½-3 | 2½-3 | 2½-3 | 2½-3 | 2½-3 | 2½-3 | 2½-3 | 2½-3 |
| Corrosion: Average wt. loss (mg.) | 1.70 | .05 | .05 | 1.40 | .33 | .20 | .13 | 1.58 | .05 | .05 | 1.58 | .05 | .10 | .05 | .00 | 1.43 |
| Percent inhibition | 0 | 100 | 100 | 18.18 | 83.03 | 90.91 | 95.16 | 0 | 100 | 100 | 0 | 100 | 96.74 | 100 | 100 | 9.80 |

| Formulation | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| Concentration (g./100 ml.) | 3.50 | 3.00 | 3.025 | 3.025 | 3.19 | 3.22 | 3.033 | 4.00 | 2.26 | 2.285 | 2.285 | 2.293 | 2.41 | 2.51 | 0.535 | 2.725 |
| Time for 100% of coating to be removed (min.): System: | | | | | | | | | | | | | | | | |
| 1 | 2-2¼ | 2-2¼ | 2-2¼ | 2-2¼ | 2-2¼ | 2-2¼ | 2-2¼ | 2-2¼ | 2½-3 | 2½-3 | 2½-3 | 2½-3 | 2½-3 | 2½-3 | | |
| 2 | 5¾-6 | 5¾-6 | 5¾-6 | 5¾-6 | 5¾-6 | 5¾-6 | 5¾-6 | 5¾-6 | 7-7½ | 7-7½ | 7-7½ | 7-7½ | 7-7½ | 7-7½ | | |
| 3 | 7½-8 | 7½-8 | 7½-8 | 7½-8 | 7½-8 | 7½-8 | 7½-8 | 7½-8 | 8½-9 | 8½-9 | 8½-9 | 8½-9 | 8½-9 | 8½-9 | | |
| 4 | 2½-3 | 2½-3 | 2½-3 | 2½-3 | 2½-3 | 2½-3 | 2½-3 | 2½-3 | 4-4¼ | 4-4¼ | 4-4¼ | 4-4¼ | 4-4¼ | 4-4¼ | | |
| Corrosion: Average wt. loss (mg.) | .10 | 1.58 | .05 | .05 | .10 | .13 | 1.13 | .15 | 1.33 | .05 | .03 | 1.05 | .85 | .15 | 63.6 | .53 |
| Percent inhibition | 96.74 | 0 | 100 | 100 | 96.74 | 94.78 | 29.41 | 93.46 | 0 | 100 | 100 | 21.87 | 37.50 | 92.19 | | 71.01 |

All of the aqueous compositions were effective in the removal of paints from the panels regardless of the corrosion inhibitors utilized. Examples 1 to 7 of Table III contain 2 grams of sodium metasilicate on an anhydrous basis per 100 ml. of water on an anhydrous basis, maintained at a pH of 13. It is seen that the weight loss of 1.7 mg. of formulation 1, which contains no inhibitor, is completely eliminated by the utilization of 1.23% of sodium or potassium stannate as shown in Examples 2 and 3. Examples 4 through 7 show the effects of using potassium chromate as an inhibitor. It is seen that a composition having a potassium chromate content of approximately 50% is required in order to obtain the desired corlation 24, i.e., 25%, resulted in improved inhibitor properties. However, it is noted that formulation 24 is less effective than formulations 20 and 22 which utilize 0.82% sodium and potassium stannate, respectively. It is noted that higher concentrations of the stannates are not always as effective as lower concentrations. For example, the utilization of 6.83% potassium stannate in formulation 22 resulted in 94.78 percent inhibition, whereas the utilization of 0.82 (formulation 20) resulted in 100% inhibition.

Formulation 25 introduces another paint remover in which sodium resinate is utilized in conjunction with the silicate. Formulations 26 and 27 show that approximately 1% sodium and potassium stannate give complete inhibition. Formulations 28 and 29 show that 1.44% to 6.22% of potassium chromate are ineffective as inhibitors, but that good corrosion inhibition is obtained with 9.96% chromate. Formulation 31 illustrates the fact that the silicate acts jointly with the stannates in producing inhibition. Notwithstanding the maintenance of the solution of formulation 31 at a pH of 12.9, intense attack of the metal results. Formulation 32 illustrates the effect of a pH above 13.0. This solution is maintained at pH 13.1. Very poor inhibition is obtained with stannates at this pH in boiling solution, indicating a limiting value of inhibition in the neighborhood of pH 13.0 for boiling aqueous solutions.

Although we have described our invention with a certain degree of particularity, we wish it to be understood that we do not desire to be limited to the exact details of formulations shown and described, for obvious modification will occur to a person skilled in the art.

Having described our invention, we claim:

1. A paint removing composition consisting of about 98.77% sodium metasilicate and about 1.23% alkali metal stannate selected from the group consisting of sodium and potassium, said proportions being on a percent by weight basis.

2. An aqueous solution of the composition of claim 1 consisting of about 2.025 to 3.220 grams of composition per 100 ml. of solution.

3. A paint removing composition consisting of about 62.11 to 79.21% sodium metasilicate, about 18.38 to 33.08% dodecylbenzene sodium sulfonate and about 0.83 to 8.09% alkali metal stannate selected from the group consisting of sodium and potassium, said proportions being on a percent by weight basis.

4. An aqueous solution of the composition of claim 3 consisting of about 2.025 to 3.220 grams of composition per 100 ml. of solution.

5. A paint removing composition consisting of about 72.11 to 79.21% sodium metasilicate, about 17.93 to 19.70% sodium resinate, and about 1.09% alkali metal stannate, said proportions being on a percent by weight basis.

6. An aqueous solution of the composition of claim 5 consisting of about 2.025 to 3.220 grams of composition per 100 ml. of solution.

References Cited

UNITED STATES PATENTS

| | | | |
|---|---|---|---|
| 3,034,210 | 5/1962 | De Long | 252—389 X |
| 2,975,140 | 3/1961 | Yaroch | 252—110 |
| 2,947,639 | 8/1960 | Balden | 117—130 X |
| 2,898,246 | 8/1959 | Hannah | 252—156 X |
| 2,822,325 | 2/1958 | Tinnon et al. | 204—54 L X |
| 1,939,421 | 12/1933 | Tosterud | 148—6.27 X |

OTHER REFERENCES

The Chemical Formulary, vol. XIII, edited by H. Bennett, 1967, page 195.

Protective Coatings for Metals, by R. M. Burns and W. W. Bradley, 1955, pages 156 and 165.

MAYER WEINBLATT, Primary Examiner

D. L. ALBRECHT, Assistant Examiner

U.S. Cl. X.R.

117—130; 134—38; 148—6.27; 252—135, 156, 387, 389, 539, DIG 8